United States Patent
Daymond

[15] 3,698,193
[45] Oct. 17, 1972

[54] CONDUITS

[72] Inventor: Stewart F. Daymond, 383 Victoria Avenue, Chatham, Ontario, Canada

[22] Filed: April 9, 1971

[21] Appl. No.: 132,648

Related U.S. Application Data

[63] Continuation-in-part of Ser. No. 105,065, Jan. 8, 1971, which is a continuation of Ser. No. 790,544, Jan. 13, 1969, abandoned, which is a continuation-in-part of Ser. No. 710,371, March 4, 1968, abandoned.

[30] Foreign Application Priority Data

April 15, 1966  Canada.....................958,055

[52] U.S. Cl. .................................................61/1 R
[51] Int. Cl. ..............................................E02b 3/00
[58] Field of Search ....................61/1 R, 70, 10–13, 61/5, 6; 49/412, 488

[56] References Cited

UNITED STATES PATENTS

| | | | |
|---|---|---|---|
| 3,024,504 | 3/1962 | Miller | 49/488 |
| 3,050,750 | 8/1962 | Harrison | 61/1 |
| 3,151,463 | 10/1964 | Talbott | 61/1 |
| 3,250,040 | 5/1966 | Squires | 49/482 |
| 3,293,861 | 12/1966 | Hinde | 61/1 |
| 3,318,098 | 5/1967 | Haddinott et al. | 61/1 |
| 3,401,529 | 9/1968 | Fifeld | 61/70 |

Primary Examiner—Peter M. Caun
Attorney—Stevens, Davis, Miller & Mosher

[57] ABSTRACT

A weighted, elastically deformable conduit having discharge openings spaced along the length thereof and adapted to be submerged beneath the surface of a liquid to be agitated, aerated or displaced by means of compressed air discharged from said openings, is described. The conduit wall is sufficiently thin and flexible so that the conduit collapses under the influence of the liquid pressure on the outside of same when the supply of pressurized air to the interior of the conduit is shut off. In addition, the discharge outlets are located in those portions of the conduit wall adjacent the weight retaining means. Both these features contribute towards the elimination of foreign material from the interior of the conduit, especially around the discharge openings, which might tend to clog the latter.

5 Claims, 7 Drawing Figures

PATENTED OCT 17 1972 3,698,193
SHEET 1 OF 2
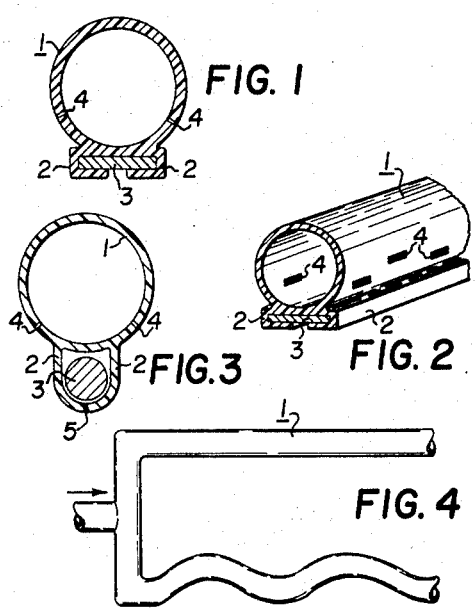
FIG. 1
FIG. 2
FIG. 3
FIG. 4
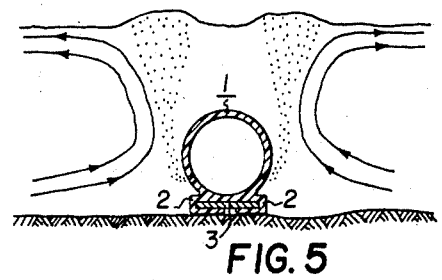
FIG. 5
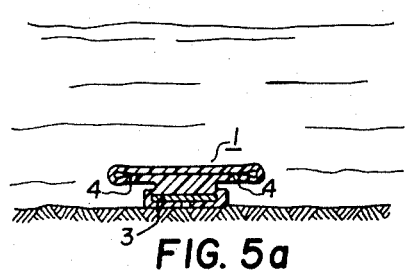
FIG. 5a 3,698,193

CONDUITS

CROSS REFERENCES TO RELATED APPLICATIONS

This application is a continuation-in-part of my co-pending application Ser. No. 105,065, filed Jan. 8, 1971, which is a continuation of my application Ser. No. 790,544 filed Jan. 13, 1969 and now abandoned, which, in turn, was a continuation-in-part of my application Ser. No. 710,371 filed Mar. 4, 1968 and now abandoned.

BACKGROUND OF THE INVENTION

This invention relates to improvements in devices for agitating, aerating and vertically displacing liquids such as might be found in sewage lagoons or bodies of water where it is desired that ice should not form, or where it is desired to accelerate bacteriological action or the like.

Conduits for the above mentioned purposes are well known in the prior art. These conduits usually are laid on the beds of lagoons, lakes or rivers and supplied with compressed air which is discharged through small spaced apart openings in the conduits to effect the required agitation, aeration or displacement of the liquids concerned. One typical prior art conduit is shown in U.S. Pat. No. 3,293,861 to Hinde. This patent discloses a flexible tube having a weight connected to its bottom side to maintain same on the bed of the body of liquid. A plurality of self closing slits formed in the upper half of the tube along its length serve to release air in a controlled fashion from the tube interior.

One vexing problem in underwater de-icing and agitation conduits of the type under consideration is that of silt and water infiltration into the interior of the conduit during periods of time when the conduit is not in use i.e., when compressed air is not being supplied to the interior thereof. Hinde, above mentioned, attempts to avoid this problem by providing a tubing wall which is just sufficiently flexible as to permit the air outlet slits to be forced open under the influence of air pressure while at the same time carefully keeping the slits on the top side of the tubing. Other prior art devices have attempted to solve this problem by keeping the conduit well above the bottom of the body of liquid in question.

SUMMARY OF THE INVENTION

The conduit of the present invention provides a fresh approach towards the overcoming of the above mentioned problem. The present invention, as with Hinde, relates to a weighted conduit which lies on the bottom of the body of water. However it differs from Hinde and other comparable prior art devices by providing the discharge outlets or openings in the lower half of the conduit wall adjacent the weight retaining means and by making the conduit wall sufficiently thin and flexible so that the conduit collapses under the influence of the liquid pressure on the outside of same when the supply of pressurized air to the interior of the conduit is shut off. By making the conduit such that it collapses in this manner there is practically no space left inside the conduit into which water and foreign matter can enter. Furthermore, upon re-application of air pressure to the conduit interior, the location of the discharge openings in the lower half of the conduit readily permits any small amounts of liquids and foreign matter which may have entered the conduit while in the collapsed state to be expelled therefrom. At the same time the flexing of the conduit wall in the region of the outlets which takes place upon expansion of the conduit at the time of re-application of air pressure materially assists in freeing these outlets from deposits which have a tendency to form there and clog same when the conduit is out of use for a period of time.

Accordingly therefore the present invention relates to a conduit for use in the agitation, aeration or displacement of liquids, which includes a wall formed of a flexible substantially fluid impervious material, and a retaining means connected to such wall and adapted to embrace an elongated weight such that the latter extends lengthwise of the conduit whereby the conduit can be retained submerged beneath the surface and on the bed of a body of liquid such as a lake, river, sewage lagoon or the like. That portion of the wall of the conduit which is located adjacent the retaining means is provided with a plurality of discharge openings spaced along the length of the conduit by means of which a compressed gas supplied to the interior of the conduit is discharged therefrom to effect the required agitation, aeration or displacement of the body of liquid. Furthermore, the conduit wall is made sufficiently flexible such that when the conduit is lying on the bed of said body of liquid the conduit assumes a collapsed form under the influence of the hydrostatic pressures exerted by the body of liquid when the compressed gas is not being supplied to the interior thereof with the conduit adapted to assume an expanded, inflated condition when said compressed gas is supplied to the interior thereof. The two above mentioned features act to contribute to the elimination of both solid and liquid foreign material from the conduit interior and to the elimination of deposits that have a tendency to form around the discharge openings.

BRIEF DESCRIPTION OF THE DRAWINGS

The invention is illustrated in the accompanying drawings in which:

FIG. 1 is a cross section of one form of conduit;

FIG. 2 is a perspective view of a portion of the conduit shown in FIG. 1;

FIG. 3 is a cross section of an alternative form of conduit;

FIG. 4 is a plan view showing conduits in situ; and

FIG. 5 is a diagrammatic end view of the conduit of FIGS. 1 and 2 showing the path of the compressed elastic fluid issuing from said conduit;

FIG. 5A is a view similar to FIG. 5 illustrating the configuration of the conduit when the supply of compressed air to the interior thereof has been shut off;

DETAILED DESCRIPTION

Figure 6:
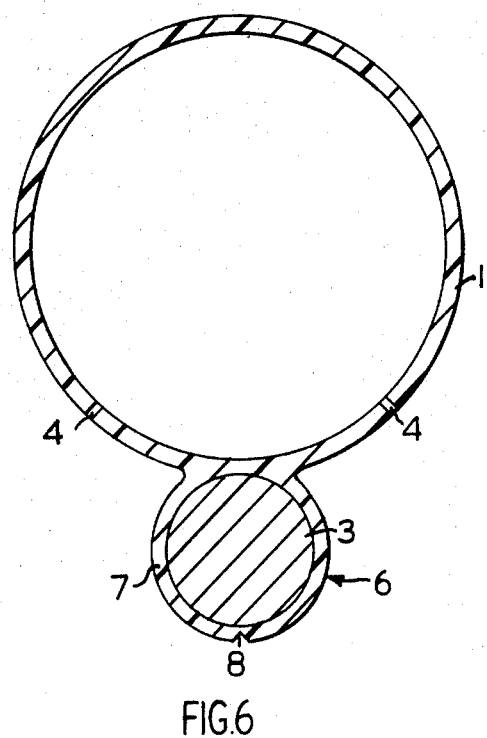
FIG. 6 is a cross section view of an alternative form of conduit.

Referring to FIG. 1–5 of the drawings, and in particular to FIG. 1, a conduit indicated generally at 1 is formed from a flexible substantially fluid impervious material, such as, for example, flexible vinyl plastic.

The lower portion of the conduit 1 is provided with a retaining means in the form of a pair of flanges 2 integrally formed with the wall of the conduit adapted to embrace a sinker or weight 3 such as, for example, an elongated slender bar of lead which serves to retain the conduit submerged beneath the surface of a liquid body, such as a sewage lagoon, lake, river or other body of liquid which is to be agitated, aerated or displaced. In this embodiment the natural resistance of the flanges 2 to deformation retains the weight 3 in a proper position.

The portion of the wall of the conduit located adjacent the retaining flanges 2 is provided with a plurality of staggered and spaced discharge openings 4. The discharge openings 4 are of a predetermined shape, width and length, each preferably being a slit 0.15 to 0.18 inches long, with opposite rows of slits preferably being arranged at an angle of about 120° to one another measured about the longitudinal axis of conduit. The discharge openings 4 are also preferably spaced apart on 3 inch centers which are staggered with respect to one another.

An alternative form of the invention is shown in FIG. 3 where, as will be seen, the free ends of the retaining flanges 2 are heat-sealed together at 5 after the weight 3 has been placed in situ.

As will be appreciated, owing to the choice of material employed in the moulding of the conduits shown in FIGS. 1 and 2, it is a relatively simple matter to remove the weight from the flanges so as to permit easier transportation, storage and handling of the conduits and weights. Inasmuch as the conduit is under constant operative stress it may be that its expectancy of working lift may be limited. Hence, the relatively easy detachability of the weight from the retaining flanges also enables the said weight to be connected to the new conduits as and when required.

Again, and in connection with the type of conduit shown in FIG. 3, recovery of the weight from a worn out conduit is relatively easy for subsequent re-use.

FIG. 6 is a cross section view of a further modification wherein the conduit 1 has an elongated weight 3 attached thereto (and extending lengthwise thereof) by retaining means 6 which comprises a retaining wall 7 of said flexible, substantially water impervious material, which completely surrounds the weight 3 along the length of the latter. A portion of the retaining wall 7 remote from the wall of the conduit 1 is provided with a notch 8 which extends the length of the retaining wall. This notch is made just deep enough to weaken wall 7 and facilitate stripping and recovery of the weight 3 from a worn-out conduit but not so deep as to permit tearing of the retaining wall 7 and subsequent loss of weight 3 during normal usage.

The embodiment shown in FIG. 6 is conveniently formed by extruding by means of a crosshead tooling arrangement with weight 3 being placed in its proper position within the retaining wall 7 during the extrusion operation. This operation is advantageous in that it eliminates post-extrusion assembly operations as well as the sealing operation described with reference to FIG. 3.

In operation, although it is immaterial how the conduits are laid on the bed of the sewage lagoon, lake, etc., they can be either in straight or sinusoidal lines or a combination of both such as is shown in FIG. 4 with the ends of the conduits being connected to any suitable source (not shown) of compressed elastic fluid such as for example, compressed air, the latter being indicated as flowing in the direction of the arrow shown in FIG. 4.

As mentioned previously, two notable features of the present invention involve the provision of the discharge outlets 4 in the lower half of the conduit wall adjacent the weight retaining means 2 as well as the provision of a conduit wall sufficiently thin and flexible so that the conduit collapses under the influence of the hydrostatic pressures on the outside of same when the supply of pressurized air to the interior of the conduit is absent. When compressed air is being supplied to the interior of the conduit lying on the bed of a body of liquid as illustrated in FIG. 5, the conduit expands and assumes the fully inflated generally circular cross sectional shape shown in any FIGS. 1–3 and 5. Under these conditions the compressed air issues in the form of small bubbles from the spaced discharge openings 4 and these bubbles travel upwardly towards the surface of the body of liquid as shown in FIG. 5 thus serving to agitate, aerate or vertically displace the liquid thereby to achieve the desired results. However, when the supply of compressed air is shut off, the thin wall flexible conduit collapses under the influence of the surrounding hydrostatic pressures and assumes the collapsed condition generally as shown in FIG. 5A. In the collapsed condition, there is practically no space left inside the conduit 1 into which water and foreign matter can enter. Furthermore, when the air pressure is re-applied to the conduit interior, the location of the discharge openings in the lower half of the conduit readily provides for any small amounts of liquid and foreign material which may have entered the conduit while in the collapsed state to be thoroughly expelled therefrom. At the same time, the flexing of the conduit wall, particularly that flexing in the region of discharge outlets 4 which takes place at the time of inflation of the conduit, assists in freeing these outlets 4 from deposits which have a tendency to form there.

As those skilled in the art will appreciate, the nominal diameter of the conduit in the inflated condition, the nominal thickness of the wall of the conduit, and the physical properties of the material from which the conduits are made are related one to another as well as to several other factors. Those skilled in the art will realize that the total volume of air flow will be a function of the air pressure and the size and number of outlet openings. The conduit must of course be of sufficient nominal diameter and wall thickness as to accommodate the required volume flow of compressed air at the selected operating pressure. At the same time the nominal diameter, wall thickness, and material must be chosen so as to provide collapse of the wall at the desired operating depth on removal of the air pressure. As mentioned previously, in the preferred form of the invention the outlet openings 4 are in the form of slits. Hence, the ease with which these slits open under the influence of the applied air pressure will be a function also of the wall thickness and the material used.

The nominal diameter of the conduit influences to a large extent the upward buoyancy force acting on the conduit when in use which, in turn, determines the size of the lead counterweight required to counteract such buoyancy and maintain the conduit on the bed of the body of liquid.

As far as the choice of materials suitable for use in the conduit is concerned, several thermoplastic materials have characteristics that lend themselves well to this application. Flexible polyvinyl chloride plastic is particularly favored in this case because its availability in a wide range of hardness (durometer) values offers wide design flexiblity. Thus, the particular grade of flexible polyvinyl chloride chosen is an important consideration interrelating the various design factors such as the nominal diameter, wall thickness, etc. to the desired conduit collapse feature on relief of air pressure as well as to the required valve action of the slit discharge openings 4 required in the given installation. In addition, polyvinyl chloride's wide range of chemical resistance and excellent aging characteristics are important contributions to the overall product design.

The invention will be further illustrated with reference to a specific example.

EXAMPLE

| | |
|---|---|
| Outside diameter of conduit | 0.872 inch. |
| Nominal wall thickness | 0.031 inch |
| Material | Flexible polyvinyl chloride plastic |
| Hardness of Material (determines degree of flexibility) | 70–80 Durometer (ASTM D1706–64T) |
| Air outlet openings | slits (.150–.180 inch long) 1.5 inches apart staggered on opposite sides of conduit. |
| Operating air pressure | 12 psi |
| Operating depth below water surface | 2 to 6 ft. |
| Weight of lead counterweight | .310 lb/ft. |

The above Example should be taken in an illustrative and not in a limiting sense as modifications thereof will be apparent to those skilled in the art.

I claim:

1. A conduit for use in the agitation, aeration or displacement of liquids including a wall formed of a flexible substantially fluid impervious material, and a retaining means connected to the wall and adapted to embrace an elongated weight such that the latter extends lengthwise of the conduit whereby said conduit can be retained submerged beneath the surface and on the bed of a body of liquid to be agitated, aerated or displaced such as a lake, river, sewage lagoon or the like, that portion of the wall of the conduit located adjacent said retaining means being provided with a plurality of discharge openings spaced along the length of said conduit and by means of which a compressed gas supplied to the interior of the conduit is discharged therefrom to effect said agitation, aeration or displacement of said liquid, said conduit wall being sufficiently flexible such that when the conduit is lying on the bed of the body of liquid, the conduit assumes a collapsed form under the influence of the hydrostatic pressures exerted by the body of liquid when the compressed gas is not being supplied to the interior thereof, with said conduit adapted to assume an expanded, inflated condition when said compressed gas is supplied to the interior thereof whereby to materially contribute to the elimination of both solids and liquids from the conduit interior and to the elimination of deposits that have a tendency to form around the discharge openings.

2. The conduit according to claim 1 in combination with an elongated weight extending lengthwise of said conduit and embraced by said retaining means whereby said weight is secured to the conduit.

3. The combination according to claim 2 wherein said retaining means includes a retaining wall extending completely around the weight, said retaining wall including a weakened portion extending therealong whereby recovery of said weight by stripping same from a worn-out conduit is facilitated.

4. The conduit according to claim 1 wherein said material comprises a synthetic plastics material capable of being flexed readily.

5. The conduit according to claim 1 wherein said discharge openings comprise slits which open under the influence of said compressed gas.

* * * * *